United States Patent [19]

Farr et al.

[11] 4,354,715
[45] Oct. 19, 1982

[54] HYDRAULIC ANTI-SKID BRAKING SYSTEMS FOR VEHICLES

[75] Inventors: Glyn P. R. Farr, Wootton; Ivan Mortimer, Solihull, both of England

[73] Assignee: Lucas Industries Limited, Birmingham, England

[21] Appl. No.: 178,382

[22] Filed: Aug. 14, 1980

[30] Foreign Application Priority Data

Aug. 14, 1979 [GB] United Kingdom ............... 7928206
Aug. 18, 1979 [GB] United Kingdom ............... 7928847
Jul. 24, 1980 [GB] United Kingdom ............... 8024203

[51] Int. Cl.$^3$ ............................................. B60T 8/02
[52] U.S. Cl. ................................... 303/116; 303/10
[58] Field of Search ............... 303/116, 115, 119, 117, 303/114, 10–12, 6 R, 6 A, 68–69, 61–63; 188/181, 345

[56] References Cited

U.S. PATENT DOCUMENTS

| 3,276,822 | 10/1966 | Lister et al. | 303/116 X |
| 3,524,684 | 8/1970 | Skoyles | 303/116 |
| 3,756,666 | 9/1973 | Leiber | 303/116 X |
| 3,829,166 | 8/1974 | Menar et al. | 303/10 X |
| 3,980,346 | 9/1976 | Leiber | 303/115 X |
| 4,033,637 | 7/1977 | Leiber | 303/10 X |
| 4,046,427 | 9/1977 | Baynes et al. | 303/115 |
| 4,154,326 | 5/1979 | Wolf | 303/10 X |

FOREIGN PATENT DOCUMENTS

| 2029914 | 3/1980 | United Kingdom | 303/116 |
| 2057613 | 4/1981 | United Kingdom | 303/116 |

Primary Examiner—Douglas C. Butler
Attorney, Agent, or Firm—Scrivener, Clarke, Scrivener and Johnson

[57] ABSTRACT

An hydraulic anti-skid system incorporates a pump having a piston assembly. The piston assembly comprises a pump plunger which is reciprocable in a bore of a drive mechanism, a signal piston coupled to the pump plunger, and a spring for urging the pump plunger out of engagement with the drive mechanism. The signal piston has a first area which is exposed to the pressure from a master cylinder or the brake when the brake is applied to urge the signal piston in a direction such that the pump plunger can engage with the drive mechanism. A dump valve is provided for controlling fluid in a stop chamber to which the piston assembly is exposed at least after the brake has been applied. The dump valve is normally closed to trap fluid in the stop chamber in order to hold the piston assembly in a retracted position in which the pump plunger is disengaged from the drive mechanism, and the dump valve is movable into an open position in response to the skid signal to release fluid from the stop chamber whereafter the pump plunger can engage with the drive mechanism.

21 Claims, 4 Drawing Figures

HYDRAULIC ANTI-SKID BRAKING SYSTEMS FOR VEHICLES

This invention relates to hydraulic anti-skid braking systems for vehicles of the kind in which the supply of operating fluid from a supply to a vehicle brake is modulated in accordance with skid signals from skid sensing means.

Some known anti-skid systems of the kind set forth incorporate a pump which is driven substantially continuously to draw fluid from a reservoir and return the fluid to the reservoir after circulation in a closed circuit. A modulator assembly normally holds open a brake valve between the supply and the brake and, when a skid signal is operative, the flow from the pump is restricted to operate the modulator assembly, initially to permit the brake valve to close and subsequently to relieve the pressure applied to the brake. Alternatively fluid from the brake is dumped in the event of a skid, and the pump is operative to pump back the volume of dumped fluid for use in re-applying the brake at the termination of the skid signal.

According to our invention an hydraulic anti-skid braking system of the kind set forth incorporates a pump having a piston assembly, the piston assembly comprising a pump plunger which is reciprocable in a bore by means of a drive mechanism, a signal piston coupled to the pump plunger, and resilient means for urging the pump plunger out of engagement with the drive mechanism, the signal piston having a first area which is exposed to the pressure from the supply or the brake when the brake is applied to urge the signal piston in a direction such that the pump plunger can engage with the drive mechanism, and a dump valve for controlling fluid in a stop chamber to which the piston assembly is exposed at least after the brake has been applied, the dump valve being normally closed to trap fluid in the stop chamber in order to hold the piston assembly in a retracted position in which the pump plunger is disengaged from the drive mechanism, and the dump valve being movable into an open position in response to the skid signal to release fluid from the stop chamber whereafter the pump plunger can engage with the drive mechanism.

It follows therefore that the pump is disabled during all non-skid brake applications and is only operated during relatively short periods in which a skid is being corrected and the brakes are being re-applied following correction of the skid.

Arranging for the pump to be inoperable, and in consequence for no pumping of fluid to take place unless automatic re-application of the brake following a skid is required, has the advantage of reducing the amount of energy used in driving the pump, and of avoiding unnecessary pump wear. A further advantage is that brake fluid can be utilised (as opposed to conventional hydraulic fluid of the mineral type) whilst avoiding the degradation of the properties of brake fluid which would result if it were circulated continuously.

In addition, by providing the signal piston, reciprocation of the pump does not vibrate a master cylinder for providing the supply. This can otherwise be severe when the master cylinder is small.

In the retracted position the signal piston is held against a stop, and a spring may also act on the signal piston to urge it towards the stop.

The fluid in the stop chamber may act on the signal piston over a second area opposed to the first to hold the assembly in the retracted position. Alternatively the pump plunger and the signal piston are normally urged away from each other by a spring, and the fluid in the stop chamber acts against complementary faces on the pump plunger and the signal piston to provide a force in opposition to the pressure acting over the first area.

Preferably a spring acts to urge the pump plunger into engagement with the drive when so permitted following movement of the signal piston towards the drive means.

Conveniently the drive comprises a cam shaft which may be driven by any convenient means with the cam shaft being received in a housing which is connected to a reservoir for fluid. This has the advantage that no seal is required for the pump plunger.

When the pump is associated with a modulator assembly and the cam shaft is driven by a wheel, or from the transmission of the vehicle, a restrictor is preferably included in a connection between the stop chamber and the dump valve. This ensures that, should rotation of the cam shaft be too fast, the pressure drop across the restrictor will cause the signal piston to move against the pressure from the supply to reduce the stroke of the plunger, and hence the output of the pump. At lower speeds the signal piston will remain in an advanced position until the dump valve closes, and then the signal piston will move to disable the pump.

If an electric motor is used to drive the cam shaft then a restrictor is not essential since the speed of rotation of the cam shaft is predetermined. The electric motor can be started every time the brake is applied or when a skid signal is received.

The modulator assembly may comprise a modulator piston which is normally held in an advanced position by pressure in an expansion chamber to hold open a brake valve between the supply and the brakes, and pressure in the expansion chamber is regulated by the dump valve, with regulation of pressure in the stop chamber.

In another construction the separate modulator piston can be omitted and the signal piston itself also acts as a modulator piston, to hold open the brake valve when it is in a retracted position and to permit the brake valve to close and subsequently increase the effective volume of an expansion chamber which is defined in the bore between the signal piston and the brake valve and through which the pressure from the supply is normally supplied to the brake.

Similarly, in a construction in which the dump valve is disposed between the supply and the brake and fluid from a connection downstream of the dump valve is dumped in the event of the skid, the pump may be driven by a wheel, from the transmission of the vehicle, or by an electric motor.

Two embodiments of our invention are illustrated in the accompanying drawings in which.

Figure 1:
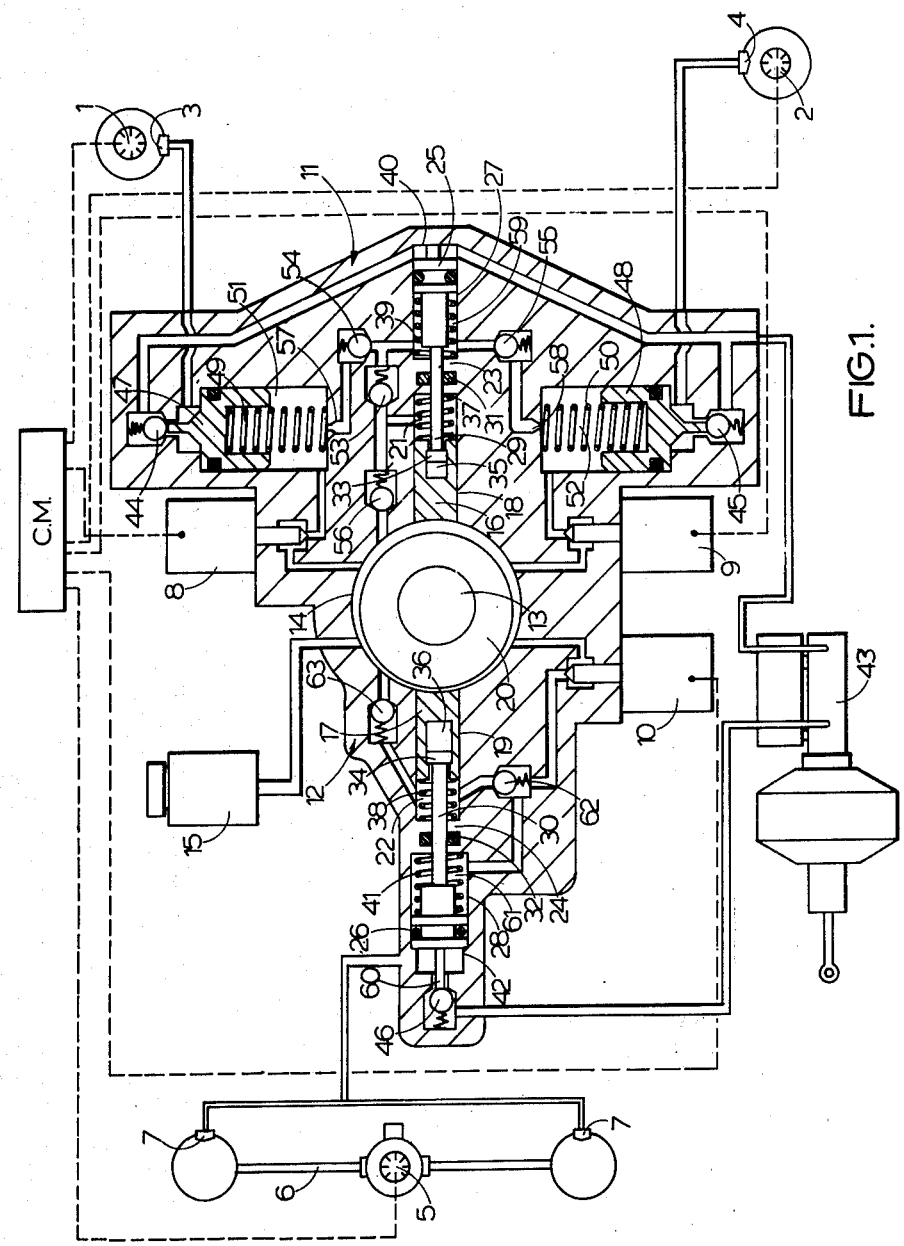
FIG. 1 is a layout of an hydraulic anti-skid braking system for a vehicle.

In the braking system shown in FIG. 1 of the drawings speed sensors 1, 2 sense the speed of rotation of each front wheel which is braked by a brake 3, 4 and a single speed sensor 5 senses the speed of rotation of a rear axle 6 for driving wheels which are braked by rear brakes 7.

The signals from the speed sensors 1, 2 and 5 are fed into an electric control module CM which analyzes the signals and emits output voltages for operating three solenoid-operated dump valves 8, 9 and 10 when a signal from an equivalent sensor 1, 2 or 5, respectively, indicates that a skid is likely to occur.

The solenoid-operated dump valves 8, 9, 10 and incorporated in, and form part of, a modulator assembly 11. The modulator assembly 11 comprises a housing 12 through which projects a transverse cam shaft 13 which can be rotated by an electric motor or from an output from the gearbox. The cam shaft 13 extends through a clearance bore 14 which is connected to a reservoir 15 for fluid. A pair of opposed pump plungers 16 and 17 work in opposed bores 18 and 19 in the housing 12. Each plunger 16, 17 is reciprocated in its bore 18, 19 by means of an eccentric cam 20 on the shaft 13. A pump chamber 21, 22 respectively is defined in each bore 18, 19, between the plunger 16, 17 and a wall 23, 24 at the inner end of each bore 18, 19. A signal piston 25, 26 works in a bore 27, 28 in the housing which is co-axial with the bore 18, 19 respectively. Each piston 25, 26 is connected to a respective pump plunger 16, 17 by means of a piston rod 29, 30 of reduced diameter which is guided to slide through a seal 31, 32 in the wall 23, 24. Each piston rod 29, 30 carries and enlarged head 33, 34 which is slidably received in a bore 35, 36 in an adjacent end of the respective plunger 16, 17 in which it is retained by a shoulder to form a lost-motion connection. Each shoulder is normally urged into engagement with the respective head 33, 34 by means of a spring 37, 38 which acts between the plunger 16, 17 and the wall 23, 24.

A spring 39 acts between the wall 23 and the signal piston 25 normally to urge the piston 25 away from the wall 23 and into a retracted position in engagement at its outer end with a stop face 40 in the housing 12 at the end of the bore 27. In this position the signal piston 25 holds the plunger 16 out of engagement with the cam 20 so that that pump plunger 16 is disabled.

Similarly a spring 41 acts between the wall 24 and the signal piston 26 normally to urge the piston 26 away from the wall 24 and into a retracted position engagement at its outer with a stop face defined by a radial shoulder 42 at an intermediate point in the length of the bore 28. In this position the signal piston 26 holds the plunger 17 out of engagement with the cam 20 so that the plunger 17 is disabled.

Hydraulic pressure from separate pressure spaces of a booster-operated tandem master cylinder assembly 43 is adapted to control operation of the brakes 3, 4 and 7. Specifically pressure from one pressure space is supplied to each front wheel brake 3, 4 through a one-way ball valve 44, 45 and that pressure also acts on the end of the signal piston 25 which is remote from the cam 20 and co-operates with the stop face 40. Similarly pressure from the other pressure space is supplied to both rear wheel brakes 7 through a one-way ball valve 46, and that pressure also acts on the end of the signal piston 26 which is remote from the cam 20 and cooperates with the shoulder 42.

The operation of each one-way valve 44, 45 is controlled by a modulator piston 47, 48 which is normally urged by a spring 49, 50 in a direction to hold a respective valve open. An expansion chamber 51, 52 is defined in a bore in which each piston 47, 48 works, on the side of the modulator piston 47, 48 which is remote from the valve 44, 45 respectively.

The pump chamber 21 is connected to each expansion chamber 51, 52 of the valves 44, 45 through a one-way valve 53, and a pair of one-way valves 54, 55, which are downstream of the valve 53, with one valve 54 or 55 leading to one respective expansion chamber 51, 52. A one-way valve 56 permits flow from the reservoir 15 into the pump chamber 21.

A restrictor 57, 58 is located between each one-way valve 54, 55 and each respective expansion chamber 51, 52.

A stop chamber 59 defined in the bore 27 between the signal piston 25 and the wall 23 is in communication with the pump chamber 21 through the one-way valve 53, and with the expansion chambers 51 and 52 through the one-way valves 54 and 55. The signal piston 25 can therefore be exposed at opposite ends to the pressures in the master cylinder 43 and the stop chamber 59.

Each solenoid-operated valve 8 and 9 controls communication between a respective expansion chamber 51, 52, and the reservoir 15.

The operation of the one-way valve 46 is controlled by the signal piston 26 through a push-rod 60.

The pump chamber 22 is connected to a stop chamber 61 defined in the bore 28 between the piston 26 and the wall 24 through a one-way valve 62, and a one-way valve 63 permits fluid to be drawn from the reservoir 15 into the pump chamber 22. The signal piston 26 can therefore be exposed at opposite ends to the pressures in the master cylinder 43 and the stop chamber 61.

The solenoid-operated valve 10 controls communication between the stop chamber 61 and the reservoir 15.

The springs 39, 41 are stronger than the springs 37, 38.

When the vehicle is in motion the shaft 13 is rotated and the two plungers 16 and 17 are normally spring-loaded away from the eccentric cam 20 by the signal pistons 25 and 26 as described above so that fluid is not circulated. The modulator pistons 47 and 48 are held by the springs 49 and 50 against their stops 40, 42 so that the valves 44, 45 are held fully open. Similarly the valve 46 is held fully open by the signal piston 26.

When the brakes are applied, the signal pistons 25, 26 are loaded towards the eccentric cam 20 by the fluid applied to the brakes from the master cylinder assembly 43 which acts on the outer ends of these pistons 25 and 26. However, since fluid is trapped in the stop chambers 59 and 61, the plungers 16 and 17 continue to be held firmly out of engagement with the cam 29 as described above.

Should one of the front wheels skid, say the wheel braked by the uppermost brake 3, the uppermost solenoid-operated dump valve 8 operates to connect the expansion chamber 51 and the stop chamber 59 to the reservoir 15. This action causes the pressure in the wheel brake 3 to force the modulator piston 47 away from the valve 44, which allows it to close. Further travel of the modulator piston 47 in the same direction expands the brake volume and relieves the pressure applied to the brake. At the same time the signal piston 25 is forced, by the pressure from the master cylinder 43, towards the eccentric cam 20. The plunger 16 is thereby permitted to reciprocate to draw fluid from the reservoir 15 and force it into the stop chamber 59 and the expansion chamber 51, from whence it is returned to the reservoir 15 through the open dump valve 8.

However, the reduction in brake pressure allows the wheel to recover from the skid so that the control module CM cancels the skid signal and the solenoid-operated dump valve 8 closes. The modulator piston 47 is then forced towards the ball valve 44 to re-apply the brake and the signal piston 25 is urged towards the stop face 40, thereby retracting the plunger 16 to disable the pump.

Whilst the front wheel associated with the brake 3 is being corrected, the modulator piston 48 for the other front wheel brake 4 does not move since the one-way valve 55 remains closed. Similarly the plunger 17 for the rear wheel brakes does not move. It follows therefore that each individual brake pressure can be modified without affecting the others.

The restrictors 57, 58 ensure that, should rotation of the cam 20 be too fast, the pressure drop across the restrictors 57, 58 will cause the signal piston 25 to move against the pressure from the master cylinder 43 to reduce the stroke of the plunger 16 and hence its output. If the cam 20 is driven at constant speed, for example by an electric motor, then the restrictors 57 and 58 are not necessary. The signal piston 25 will be spaced from the stop 40 until the valve 8 or 9 finally closes and then the signal piston 25 can move towards the stop 40 to disable the pump.

Should one or both of the rear wheels 7 skid, the solenoid-operated dump valve 10 opens to dump the pressure in the stop chamber 61 to reservoir. This action causes the pressure from the rear brakes 7 to force back the signal piston 26 away from the valve 46 which can then close. Thereafter the pressure trapped in the lines to the rear wheel brakes is reduced by retraction of the signal piston 26. This permits the plunger 17 to engage with the cam 20 by means of which it is reciprocated to draw fluid from the reservoir 15 and force it into the stop chamber 61.

However, the reduction in brake pressure cancels the skid signal so that the solenoid-operated dump valve 10 closes. The signal piston 26 is then forced relatively away from the cam 20 towards the stop face 42, initially to pressurise the volume of fluid trapped in the brake lines to re-apply the rear wheel brakes, and subsequently to re-open the valve 46. This movement of the signal piston 26 retracts the plunger from the cam 20 to disable the pump.

In a modification the two rear brakes can be controlled separately as the front wheel brakes, but this will necessitate the incorporation of an extra solenoid valve, an additional skid sensor, and a pair of modulator pistons, each controlling a separate one-way brake valve.

Figure 2:
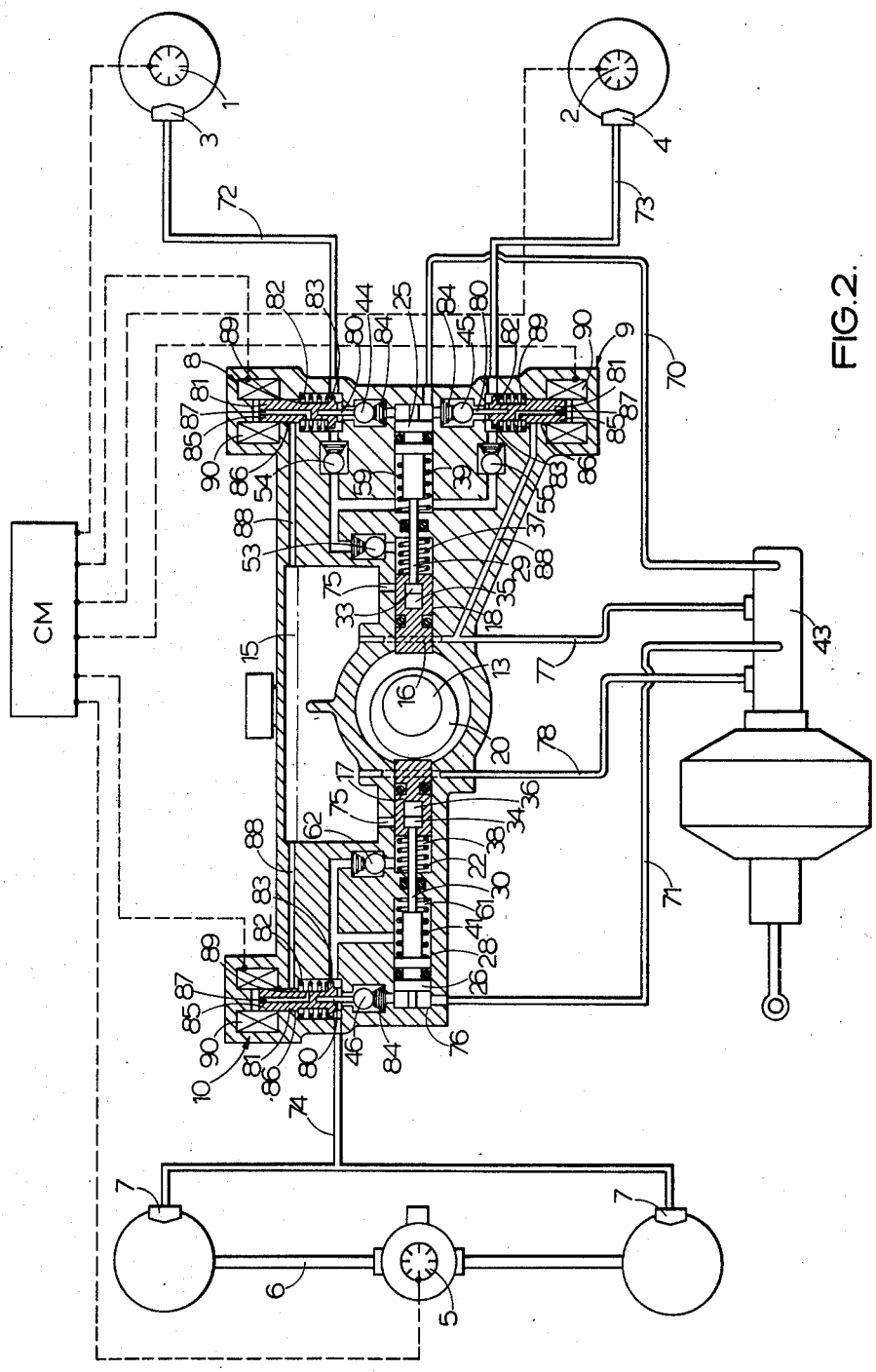
FIG. 2 is a layout of another anti-skid braking system for a vehicle.

In the braking system illustrated in the layout of FIG. 2 each solenoid-operated dump valve 8, 9, 10 is combined with, and is adapted to control operation of, a respective one of the ball-valves 44, 45, 46 which act as cut-off valves and are disposed between respective delivery lines 70, 71 from respective pressure spaces of the master cylinder 43 and supply lines 72, 73 and 74 leading from the modulator assembly 11 to the brakes 3, 4 and 7.

The one-way valves 56 and 63 are replaced by respective ports 75 leading to the reservoir 15 which in this embodiment also serves the master cylinder 43 and is formed as an integral part of the modulator assembly 11.

A stop for the piston 26 is defined by a wall 72 at the closed end of the bore 28.

Pipe-lines 77 and 78 from the reservoir 15 provide recuperation of fluid to the pressure spaces of the master cylinder 34 when the master cylinder is in an inoperative position.

The solenoid-operated dump valves 8, 9, 10 are identical in construction so that only one need be described. As illustrated each dump valve 8, 9, 10 comprises a pin 80 which is fast with cylindrical armature 81 urged to the position shown in the drawings by a coiled compression spring 82 abutting against a radial flange 83 on the armature 81. In this position the pin 80 holds the respective ball-valve 44, 45, 46 away from its seating against the loading of a compression return spring 84. The armature 81 has a portion 85 remote from the pin 80 which is slidably guided in a bore 86 in the housing 12 and is provided with a through bore 87 for pressure balancing of the armature 81.

The armature 81 acts as the spool valve member of a dump valve. A dump passage 88 breaks into the bore 86 and the position of a step 89 on the armature 81 in relation to the dump passage 88 controls the opening and closing of the dump passage 88 on axial movement of the armature 81 under the control of a solenoid 90, of which energisation is controlled by the control module CM.

When the master cylinder 43 is operated hydraulic fluid under pressure is present in the stop chambers 59, 61 to hold the plungers 16, 17 clear of the eccentric cam 20. Energisation of the solenoid 90 of valve 8 for example results in closure of the valve 44 and dumping of fluid from brake line 72 via the dump passage 88 to the reservoir 15. Since the pressure in the chamber containing the spring 82 falls the preloading of the ball valve 54 is overcome by the pressure of trapped fluid in the stop chamber 59, so that fluid is expelled by the way of the passage 88 from the chamber 59 under the force of the pressure in the master cylinder 43 acting on the piston 25. Inward movement of the piston 25 allows the spring 37 to move the plunger 16 inwardly to engage with the eccentric cam 20. The plunger 16 will then be reciprocated by the eccentric cam 20 and will initially pump fluid from the reservoir port 75 through the valve 53, the valve 54, and then the chamber containing the spring 82 and the dump passage 88 back to the reservoir 15. However, on termination of the skid signal in the control module CM, the solenoid 90 of the valve 44 will be de-energised to allow the armature 81 to move downwards under the force of the spring 82. Since the pressure in the chamber containing the spring 82 is less than that in the master cylinder 43, the cut-off valve member 44 will be held against its seat by the pressure differential and the pin 80 will not initially unseat the valve member 44. The downward displacement of the armature 81 isolates the chamber containing the spring 82 from the dump passage 88 so that fluid is then pumped by the pump plunger 16 to the brake line 72 and the pressure in the brake line 72 and in the cylinder of the brake 3 is increased in a step-wise manner by reciprocation of the pump plunger 16. In most skid situations it will be necessary to reduce and increase the wheel brake pressure several times before the skid control has been cured. Each time a skid signal is produced in the control movable CM the armature 81 will move upwardly to dump fluid from the brake line 72. The cut-off valve member 44 will not re-open until the brake pressure reaches the pressure then established in the master cylinder 43 without a skid signal being produced.

As the skid condition is corrected and the pressure in the line 72 is increased, the pressure in the chamber 59 is also necessarily increased so that the signal piston 25 moves to the right to pull the pump plunger 16 clear of the eccentric cam 20. The pressurised fluid in the chamber 59 is retained by ball valve 53 to hold the pump plunger 16 disabled until either of the valve assemblies 8 or 9 is reactuated.

When the brakes are released the pressure in chamber 59 disappears but the spring 39 still holds the signal piston 25 in its retracted position.

It will be appreciated that the operation of the valves 9 and 10 in correcting a skid condition on the front right wheel and on the rear wheels respectively is substantially identical to that of the valve 8. It should be noticed, however, that the pump plunger 16 serves either or both of the front wheels and that energisation of the solenoid of either of the valve assemblies 8 or 9 will bring the pump plunger 16 into operation.

In a modification of the system of FIG. 2 the control module CM is arranged to produce two levels of energisation of the solenoids 90. In a first stage of energisation a low current is fed to the respective solenoid to cause sufficient movement of the armature 81 to close the cut-off valve member 44, 45, 46 but to retain the dump passages 88 closed. This would provide a holding period during which the brake pressure is held constant. Such a holding period has been recognised to be desirable in certain circumstances to enable the electronic unit to distinguish between a real skid condition and a momentary deceleration of a wheel caused by a bump in the road. If the control module CM decides during the hold period that there is, in fact, an imminent skid condition the current to the solenoid would then be increased to bring about full displacement of the armature 81 to open the associated dump passage 88.

The construction and operation of the system of FIG. 2 is otherwise the same as that of FIG. 1 and corresponding reference numerals have been applied to corresponding parts.

Figure 3:
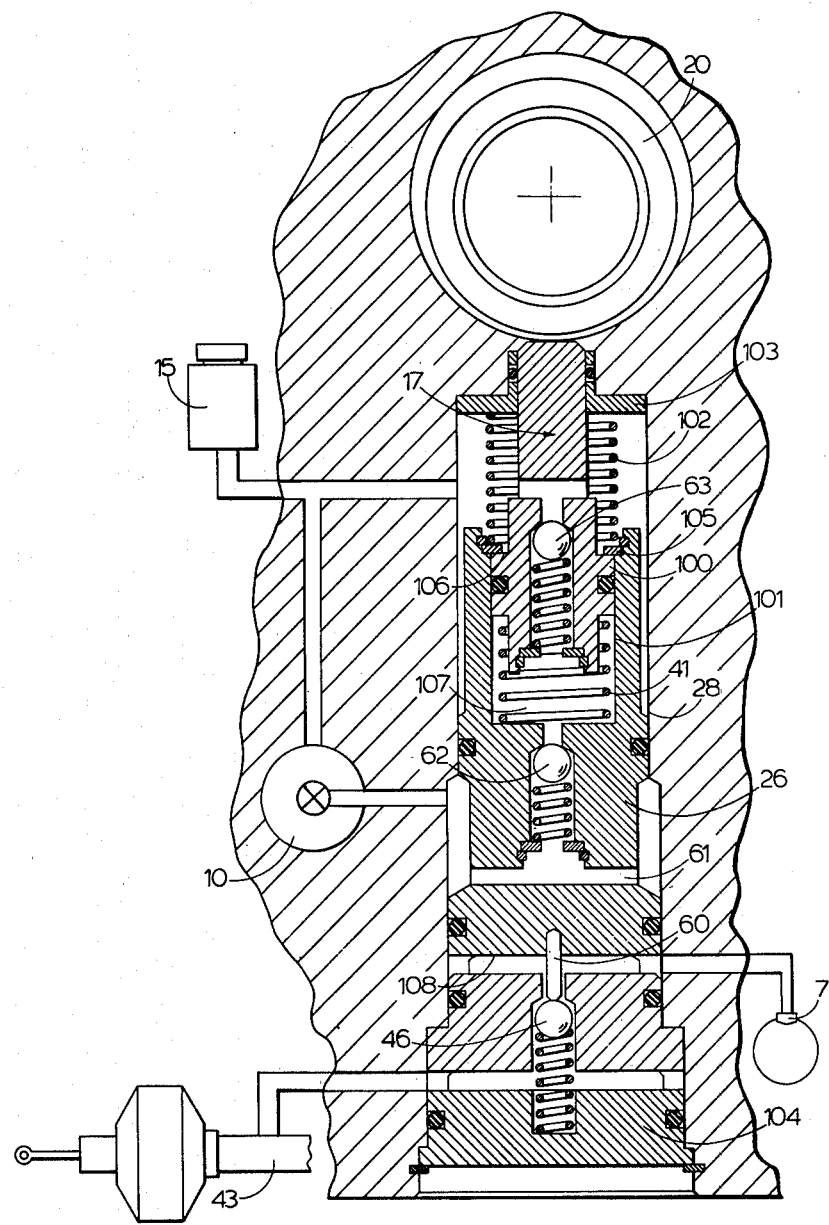
FIG. 3 is a longitudinal section through a portion of a modified modulator assembly for the braking systems of FIGS. 1 and 2.

In the modified modulator assembly illustrated in FIG. 3 of the drawings, for example to control operation of the rear wheel brakes in the braking system of FIG. 1, the plunger 17 is of stepped outline and a portion 100 adjacent to its inner end of greatest diameter works in a bore 101 in the adjacent end of the signal piston 26 which is of substantial length.

A spring 102 acts between a closure 103 for the inner end of the bore 28 and the adjacent inner end of the signal piston 26 to hold the signal piston 26 in a retracted position in engagement with a stop formed by a closure 104 for the outer end of the bore 28. In this position a radial shoulder 105 on the signal piston 26 engages with a shoulder 106 at a step at the change in diameter of the pump plunger 17 also to hold the plunger 17 in a retracted position out of engagement with the cam 20 to disable the pump.

The one-way valve 63 is housed in the pump plunger 17 to permit fluid to be drawn into pump chamber 107 between the plunger 17 and the signal piston 26 on an induction stroke of the pump, and the one-way valve 62 is housed between the pump chamber 107 and the stop chamber 61.

The signal piston 26 is also of stepped outline so that when the stop chamber 61 is pressurised by the pump during a brake application, for example following correction of a skid, the pressure in the stop chamber 61 acts over a net area sufficient to overcome the force generated by the pressure from the brakes 7 which is also acting over the first area of the signal piston 26, namely the area of the outermost end 108.

In this construction, apart from the dump valve 10, all the components of a modulator assembly are disposed within a single longitudinal bore which has stepped portions of which the diameters increase towards the outer end of greatest diameter closed by the closure 104. This facilitates manufacture and assembly.

The construction and operation of the modulator assembly of FIG. 3 is otherwise the same as that of FIG. 1 and corresponding reference numerals have been applied to corresponding parts.

Figure 4:
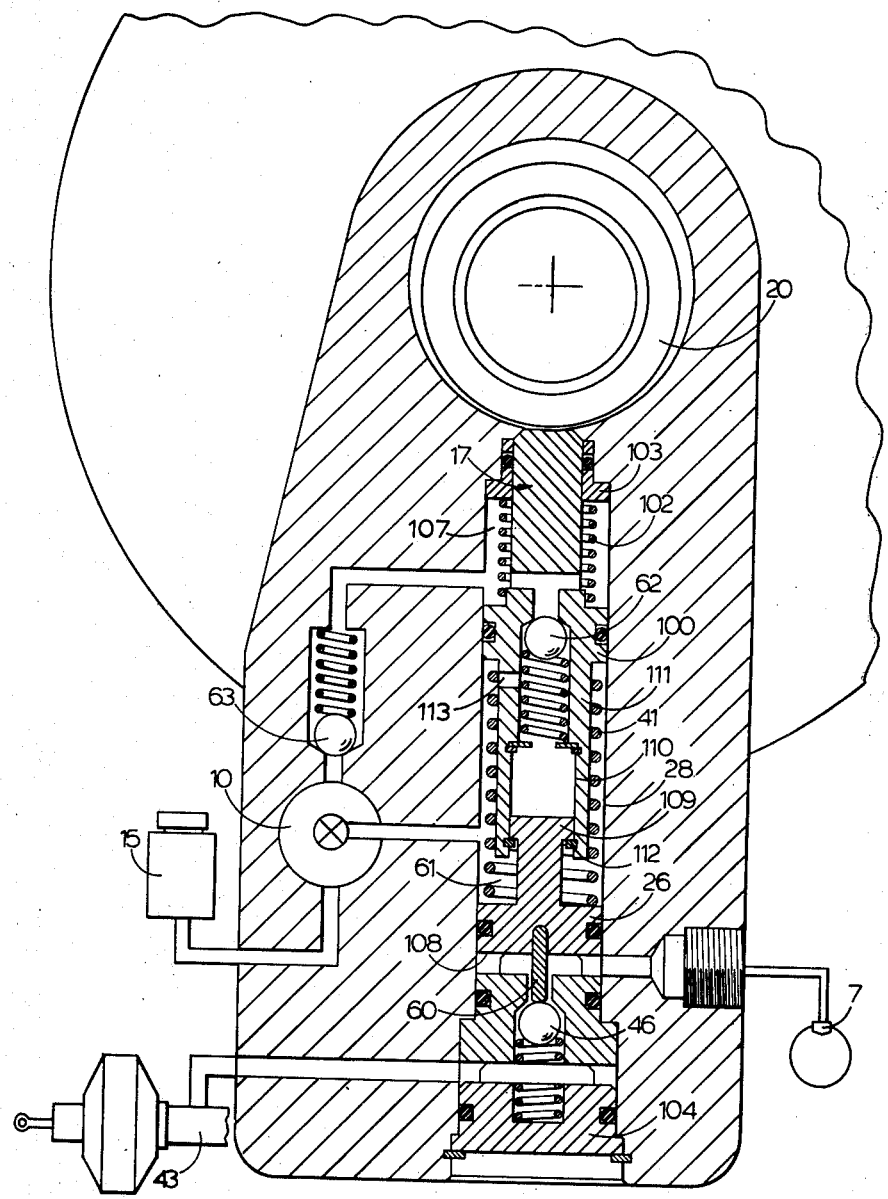
FIG. 4 is a section similar to FIG. 3 of a further modulator assembly.

In the modulator assembly of FIG. 4 the portion 100 of the plunger 17 which is of greatest diameter also works in the bore 28, and the signal piston 26 has a headed extension 109 which is of reduced diameter and which works in a bore 110 in an extension 111 at the adjacent outer end of the pump plunger 17. A radial passage 113 in the extension 111 allows free communication between the bore 110 and the stop chamber 61. The spring 41 encircles the extension 111 and acts between the plunger 17 and the signal piston 26 normally to hold the plunger 17 and signal piston 26 in an extended position with the head on the extension 109 in engagement with a radial shoulder 112 in the extension 111. The spring 102 is effective to hold the plunger 17 and the piston 26 in their retracted positions.

The valve 63 is disposed between the reservoir 15 and the pump plunger 17 in the wall of the bore 28, and the valve 62 is disposed in the pump plunger 17 at the same location as the valve 63 of FIG. 3. Thus the stop chamber 61 is defined between the piston 26 and the plunger 17, while the pump chamber 107 is defined at the inner end of the bore 28.

In the position shown in the drawing in which the dump valve is closed and the brakes 7 are applied normally by the master cylinder 43, the fluid pressure at a brake 7 acts on the area 108 of piston 26 to pressurise fluid in the stop chamber 61 between the plunger 17 and the piston 26. This pressure acts over a net effective area to generate a reaction force to hold the piston 26, and in consequence the plunger 17, in their retracted positions.

When a skid occurs the dump valve 10 is opened to dump the fluid from the stop chamber 61, so that the brake pressure acting over the area 108 urges the piston 26 towards the cam 20, initially allowing the valve 46 to close, and then increasing the brake volume to relieve the brake pressure. The spring 41 is stronger than spring 102 so that the plunger 17 moves with the piston 26 until the plunger 17 contacts the cam 20. Thereafter further movement of the piston 26 compresses the spring 41 to permit a further reduction in brake pressure, and the plunger 17 is reciprocated by the cam 20 in the bore 28 against the force in the spring 41. Movement of the plunger 17 outwardly of the bore 28 draws fluid from the reservoir 15 into the pump chamber 107 through the valve 63, and inward movement of the plunger expels the fluid from pump chamber 107 through valve 62 into the stop chamber 61, from where it returns to the reservoir 15 via the open dump valve 10. While the dump valve 10 is open, movement of the plunger 17 is accommodated by the spring 41 so that movement of the piston 26 is small.

When the skid has been corrected the dump valve closes to trap fluid in the stop chamber 61 which prevents relative movement of the plunger 17 and the piston 26 towards each other. However, the brake pressure acting over area 108 pressurises fluid in the pump chamber 107 to a pressure higher than that present in the stop chamber 61, as the area 108 is greater than the effective annular area of the chamber 107. Thus on subsequent inward movement of the plunger 17 fluid is expelled from the pump chamber 107 to the stop chamber 61 where it acts to move the piston 26 relatively away from the plunger 17 to increase the volume of the stop chamber. During the subsequent outward movement of the plunger 17, the piston 26 moves with the plunger 17 to reduce the brake volume and increase the brake pressure to a value higher than that which existed at the start of the previous stroke. Thus the brake pressure is increased in a saw-tooth fashion, reducing slightly during each delivery stroke of the pump, but increasing by a relatively greater amount during each induction stroke, until the piston 26 and plunger 17 reach their retracted positions, so that the valve 46 is opened to allow master cylinder pressure to continue re-application of the brakes.

The construction and operation of the modulator assembly of FIG. 4 is otherwise the same as that of FIG. 3 and corresponding reference numerals have been applied to corresponding parts.

We claim:

1. An hydraulic anti-skid system for a vehicle comprising a vehicle brake, a supply of operating fluid for applying said brake, skid sensing means for producing a skid signal to modulate the supply of operating fluid from said supply to said brake, a pump having a piston assembly, a drive mechanism for said pump, and means defining a stop chamber, said piston assembly comprising a pump plunger reciprocable in a bore by means of said drive mechanism, a signal piston, a coupling between said signal piston and said pump plunger, and resilient means for urging said pump plunger out of engagement with said drive mechanism, said signal piston having a first area which is exposed to pressure from said supply or from said brake when said brake is applied to urge said signal piston in a direction such that said pump plunger can engage with said drive mechanism, and a dump valve for controlling fluid in said stop chamber to which said piston assembly is exposed at least after said brake has been applied, said dump valve being normally closed to trap fluid in said stop chamber in order to hold said piston assembly in a retracted position in which said pump plunger is disengaged from said drive mechanism, and said dump valve being movable into an open position in response to said skid signal to release fluid from said drive mechanism.

2. A system as claimed in claim 1, incorporating a stop against which said signal piston is adapted to be held, and a spring acts on said signal piston to urge it towards said stop.

3. A system as claimed in claim 1, wherein said signal piston has a second area opposed to said first, and fluid in said stop chamber acts on said signal piston over said second area to hold said assembly in said retracted position.

4. A system as claimed in claim 1, wherein a spring normally urges said pump plunger and said signal piston away from each other, and fluid in said stop chamber acts against complementary faces on said pump plunger and said signal piston to provide a force in opposition to the pressure acting on said first area.

5. A system as claimed in claim 1, wherein said pump plunger and said signal piston work in different bores, and said coupling comprises an extension which works through a partition between said bores.

6. A system as claimed in claim 1, wherein said pump plunger works in a bore in said signal piston.

7. A system as claimed in claim 1, wherein said pump plunger and said signal piston both work in a common bore.

8. A system as claimed in claim 6 or claim 7, wherein a spring acts between the pump plunger and the signal piston normally to urge them away from each other.

9. A system as claimed in claim 1, wherein oppositely acting one-way valves are disposed between a reservoir for fluid and said stop chamber, and between said stop chamber and said reservoir.

10. A system as claimed in claim 9, wherein one of said one-way valves is housed in said pump plunger.

11. A system as claimed in claim 9, wherein one of the one-way valves is housed in said pump plunger, and the other of said one-way valves is housed in said signal piston.

12. A system as claimed in claim 1, wherein a spring acts to urge said pump plunger into engagement with said drive mechanism when so permitted following movement of said signal piston towards said drive mechanism.

13. A system as claimed in claim 1, wherein said drive mechanism comprises a cam shaft which is received in a housing connected to a reservoir for fluid.

14. A system as claimed in claim 13, wherein said pump is associated with a modulator assembly and said cam shaft is driven by a wheel, or from the transmission of the vehicle, a restrictor being included in a connection between said stop chamber and said dump valve.

15. A system as claimed in claim 14, wherein said modulator assembly comprises a modulator piston which is normally held in an advanced position by pressure in an expansion chamber to hold open a brake valve between said supply and said brake, and pressure in said expansion chamber is regulated by said dump valve, with regulation of pressure in said stop chamber.

16. A system as claimed in claim 14, wherein said signal piston itself acts as a modulator piston to hold open said brake valve when it is in a retracted position and to permit said brake valve to close and subsequently increase the effective volume of an expansion chamber which is defined in said bore between said signal piston and said brake valve and through which said fluid from the supply is normally supplied to said brake.

17. A system as claimed in claim 1, wherein said dump valve is disposed between said supply and said brake, and fluid from a connection downstream of said dump valve is dumped in the event of a skid, being pumped back by said pump to re-apply the brake at the termination of the skid.

18. A system as claimed in claim 1, wherein at least two pump plungers are driven by a common drive with each plunger associated with a single signal piston.

19. A system as claimed in claim 18, wherein one of said plungers is adapted to control the supply of operating fluid to said brakes on front wheels of a vehicle and the other of said plungers is adapted to control the supply of said operating fluid to brakes on rear wheels of the vehicle.

20. A system as claimed in claim 19, wherein the said one plunger is arranged to control operation of a brake on one front wheel independently of operation of a brake on the other front wheel.

21. A system as claimed in any of claim 18, wherein said stop chamber of one of a pair of signal pistons controls pressurisation of expansion chambers of a pair of modulator assemblies, and said modulator assemblies control the supply of pressure fluid from said supply to different front wheel brakes of the vehicle, the other of said signal pistons itself acting as a modulator piston for modulating the pressure fluid from the supply to the brakes on the rear wheels of the vehicle, the arrangement being such that during normal braking the drive mechanism will run free but if one of the brakes emits a skid signal the appropriate pump plunger will be reciprocated by said drive mechanism to control the respective one of said modulator pistons, the other of said modulator pistons will remain in its retracted position with its expansion chamber isolated from said stop chamber by a one-way valve, and the said other pump plunger will be unaffected.

* * * * *